US011267092B2

(12) United States Patent
Chepurny

(10) Patent No.: US 11,267,092 B2
(45) Date of Patent: Mar. 8, 2022

(54) DEBRIS CONTROL APPARATUS FOR CUTTING MACHINES

(71) Applicant: Mark P. Chepurny, Bradford (CA)

(72) Inventor: Mark P. Chepurny, Bradford (CA)

(*) Notice: Subject to any disclaimer, the term of this patent is extended or adjusted under 35 U.S.C. 154(b) by 0 days.

(21) Appl. No.: 15/438,275

(22) Filed: Feb. 21, 2017

(65) Prior Publication Data
US 2017/0282318 A1 Oct. 5, 2017

Related U.S. Application Data

(60) Provisional application No. 62/316,007, filed on Mar. 31, 2016.

(30) Foreign Application Priority Data

May 11, 2016 (CA) .............................. CA 2929584
Feb. 20, 2017 (CA) .............................. CA 2958362

(51) Int. Cl.
*B23Q 11/00* (2006.01)
*B23Q 11/08* (2006.01)
(Continued)

(52) U.S. Cl.
CPC ...... *B23Q 11/0046* (2013.01); *B23Q 11/0866* (2013.01); *B23C 1/002* (2013.01);
(Continued)

(58) Field of Classification Search
CPC ..... A47L 7/0095; A47L 9/02; B23Q 11/0866; B23Q 11/0046; B23Q 11/0042;
(Continued)

(56) References Cited

U.S. PATENT DOCUMENTS 3,837,383 A * 9/1974 Ko ..................... B23Q 11/0046
409/137
3,942,411 A * 3/1976 Gerber .................. B23Q 1/032
409/137
(Continued)

FOREIGN PATENT DOCUMENTS

DE  1947664 A * 4/1971
DE  3443398 A1 * 5/1986
JP  2000-272293 A * 10/2000

OTHER PUBLICATIONS

Machine Translation DE 1947664 A, which DE '664 was published Apr. 1971.*
(Continued)

*Primary Examiner* — Erica E Cadugan
(74) *Attorney, Agent, or Firm* — Christenson, Fonder, Dardi & Herbert PLLC; William E. Anderson

(57) ABSTRACT

A debris control apparatus comprising a debris control enclosure, the enclosure further comprising a vacuum opening in the enclosure. The vacuum opening being sized, shaped and positioned to receiving a vacuum conduit, connected to a vacuum source, for extracting the debris from the enclosure. The debris control apparatus further comprising a mounting assembly for mounting the enclosure to a machine, such that, during operation, the enclosure moves along the work material as the cutting tool moves along the work material, the enclosure being mounted independent of movement of the cutting tool in and out of the work material. The mounting assembly comprises a depth adjuster for adjusting the operating depth of the enclosure. The depth of the enclosure can be adjusted such that the debris will be contained in the enclosure during operation.

15 Claims, 13 Drawing Sheets

(51) Int. Cl.
*B23K 26/142* (2014.01)
*B23C 1/06* (2006.01)
*B23C 1/00* (2006.01)

(52) U.S. Cl.
CPC ............. *B23C 1/06* (2013.01); *Y10T 29/5105* (2015.01); *Y10T 409/30392* (2015.01); *Y10T 409/304088* (2015.01)

(58) Field of Classification Search
CPC . B23Q 11/005; B23Q 11/006; B23Q 11/0071; Y10T 408/50; Y10T 409/304088; Y10T 409/307728; Y10T 409/308288; B08B 15/04; B23K 26/142; B23C 1/002
USPC .................. 409/137, 134, 202, 212; 408/67; 451/453, 456; 15/415.1; 219/121.81, 219/121.67, 121.6–121.86
See application file for complete search history.

(56) References Cited

U.S. PATENT DOCUMENTS

| | | | | |
|---|---|---|---|---|
| 5,031,678 | A * | 7/1991 | Remmele | B23Q 11/0046 144/252.1 |
| 5,090,499 | A * | 2/1992 | Cuneo | B23Q 11/0046 173/75 |
| 5,340,247 | A * | 8/1994 | Cuneo | B23Q 1/626 409/202 |
| 5,791,842 | A * | 8/1998 | Sugata | B23Q 11/0046 409/137 |
| 6,854,937 | B1 * | 2/2005 | Weiss | B23Q 11/0046 409/137 |
| 7,160,063 | B2 * | 1/2007 | Wood | B23Q 11/0046 409/137 |
| 7,168,894 | B2 * | 1/2007 | Hansson | B23Q 11/0046 409/137 |
| 11,084,138 | B2 * | 8/2021 | Chepurny | B23K 26/38 |

OTHER PUBLICATIONS

Machine Translation of JP 2000-272293 A, which JP '293 was published Oct. 2000.*
Machine Translation of DE 3443398 A1, which DE '398 was published May 1986.*

* cited by examiner

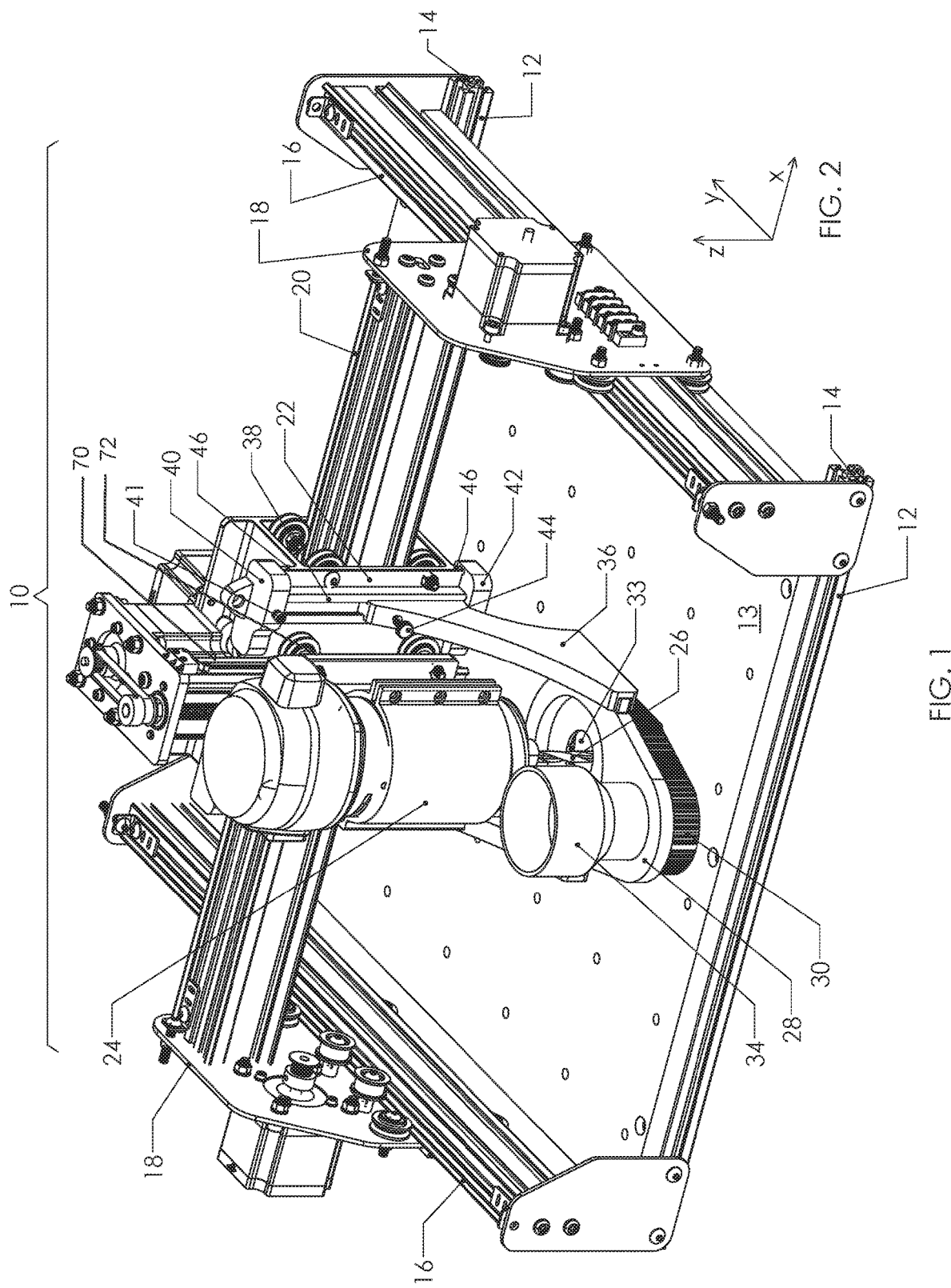

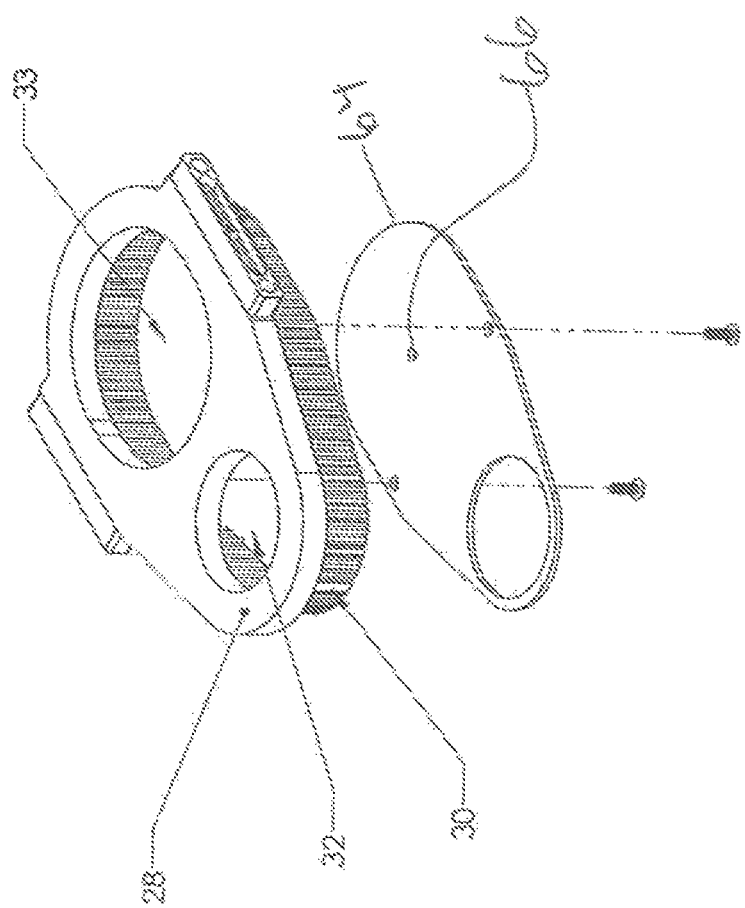

DEBRIS CONTROL APPARATUS FOR CUTTING MACHINES

RELATED APPLICATIONS

This application claims priority to Canadian Patent Application No. 2,958,362, entitled DEBRIS CONTROL APPARATUS FOR CUTTING MACHINES, filed on Feb. 20, 2017, and to Canadian Patent Application 2,929,584, filed May 11, 2016, entitled A CNC MILLING, ROUTER OR LASER SHIELD THAT CONTAINS AND REMOVES DUST, DEBRIS AND FUMES, and claims the benefit of U.S. Provisional Application No. 62/316,007, filed Mar. 31, 2016, entitled A CNC ROUTER/SPINDLE DUST AND DEBRIS SHIELDING, CONTAINING AND REMOVING DEVICE, said applications are hereby incorporated herein by reference in their entireties.

FIELD OF THE INVENTION

This invention relates to the field of cutting machines, and in particular, to the field of debris control for cutting machines.

BACKGROUND OF THE INVENTION

There are a variety of cutting machines commonly in use. Among them are lathes, mills, routers and grinders. More recently, such machines have taken the form of CNC (Computer Numerical Control) machines, which are computer controlled for high precision. Such machines typically operate continuously for a substantial period of time. This is in contrast to a traditional machine being operated by a person, which when actuated by an operator may make one cut, grind, etc., and then be stopped and repositioned by the operator for the next operation.

What such machines have in common is that, when they operate, they cut into the material they operate on, and debris is created in the process. Such debris may include a granular, powdery substance, resulting from the grinding up of the work material into a powder (often called "dust"). The debris may also take other forms, including ribbon-shaped debris, and chunks or lumps of material.

The accumulation of debris in CNC cutting machines is a frequent problem. Because the machines operate continuously for substantial periods of time, debris buildup occurs (unlike machines which are frequently stopped, in which case debris can frequently be swept away). Such debris buildup is detrimental. For example, when such debris builds up at the cutting point, it can increase the rate of wear and tear on the cutting tool (i.e. the blade, bit or other cutting tool actually working on the material). It may even cause the cutting tool to bend or break. As another example, the presence of debris can interfere with the movement of the cutting tool or cause it to deflect undesirably. Particular in high precision applications, debris accumulation can reduce the precision of the cutting below acceptable limits.

There exist in the marketplace dust boots and the like for removing dust and debris from the work surface as the material is being cut. However, these have certain drawbacks. Some are not very effective at removing debris. Some negatively affect the operation of the cutting machine.

SUMMARY OF THE INVENTION

Therefore, what is desired is an apparatus and/or method for debris control that eliminates or improves upon one or more of the negative aspects of the prior art.

Therefore, according to an aspect of the present invention there is provided a debris control apparatus for a cutting machine, wherein the cutting machine includes a cutting tool for cutting a work material, the apparatus comprising:

a debris control enclosure shaped to admit the cutting tool to the work material while containing, within the enclosure and on the work material, debris from the cutting of the work material, as the cutting tool moves along the work material, the enclosure further comprising a vacuum opening in said enclosure, the vacuum opening being sized, shaped and positioned to receiving a vacuum conduit, connected to a vacuum source, for extracting the debris from the enclosure;

a mounting assembly for mounting the enclosure to the machine such that during operation the enclosure moves along the work material as the cutting tool moves along the work material, the enclosure being mounted independent of movement of the cutting tool in and out of the work material;

the mounting assembly comprising a depth adjuster for adjusting the operating depth of the enclosure;

whereby prior to operation, the depth of the enclosure can be adjusted such that the debris will be contained in the enclosure during operation.

Preferably, the mounting assembly is configured for mounting the enclosure to the machine away from a spindle which carries the cutting tool and moves the cutting tool into and out of the work material.

Preferably, the depth is continuously adjustable within a depth adjustment range.

Preferably, the depth adjuster comprises at least one rail attachable to the machine and having a depth adjustment range, the mounting assembly comprising at least one support arm for supporting the enclosure, the support arm being selectively attachable to the rail at any point within the depth adjustment range.

Preferably, the enclosure comprises a debris shield for maintaining the debris at the work material, and a brush, depending from the shield, for controlling the debris as the cutting tool moves along the work material.

Preferably, the shield and brush are sized, shaped and mutually positioned such that the depth of the enclosure can be adjusted to position the brush lightly in contact with the work material such that when the enclosure moves along the work material, the brush maintains the debris under the shield.

Preferably, the mounting assembly and enclosure are configured for selective adjustment in the front-back direction of the operating position of the enclosure.

Preferably, the mounting assembly comprises at least one support arm for supporting the enclosure, and at least one magnetic connector for detachably attaching the enclosure to the support arm.

Preferably, the shield includes a cutting tool access opening through the shield, the cutting tool access opening being contiguous with an edge of the shield whereby the shield may be separated from the cutting tool while the cutting tool extends through the access opening.

BRIEF DESCRIPTION OF THE DRAWINGS

Reference will now be made, by way of example only, to the figures which illustrate the preferred embodiment of the invention, and in which:

FIG. 1 is a perspective view of a cutting machine with an embodiment of the debris control apparatus mounted thereto;

FIG. 2 shows a preferred coordinate system used for positioning of a cutting tool on a cutting machine;

FIG. 17 shows a laser shield according to an embodiment of the present invention.

DETAILED DESCRIPTION

Figure 3:
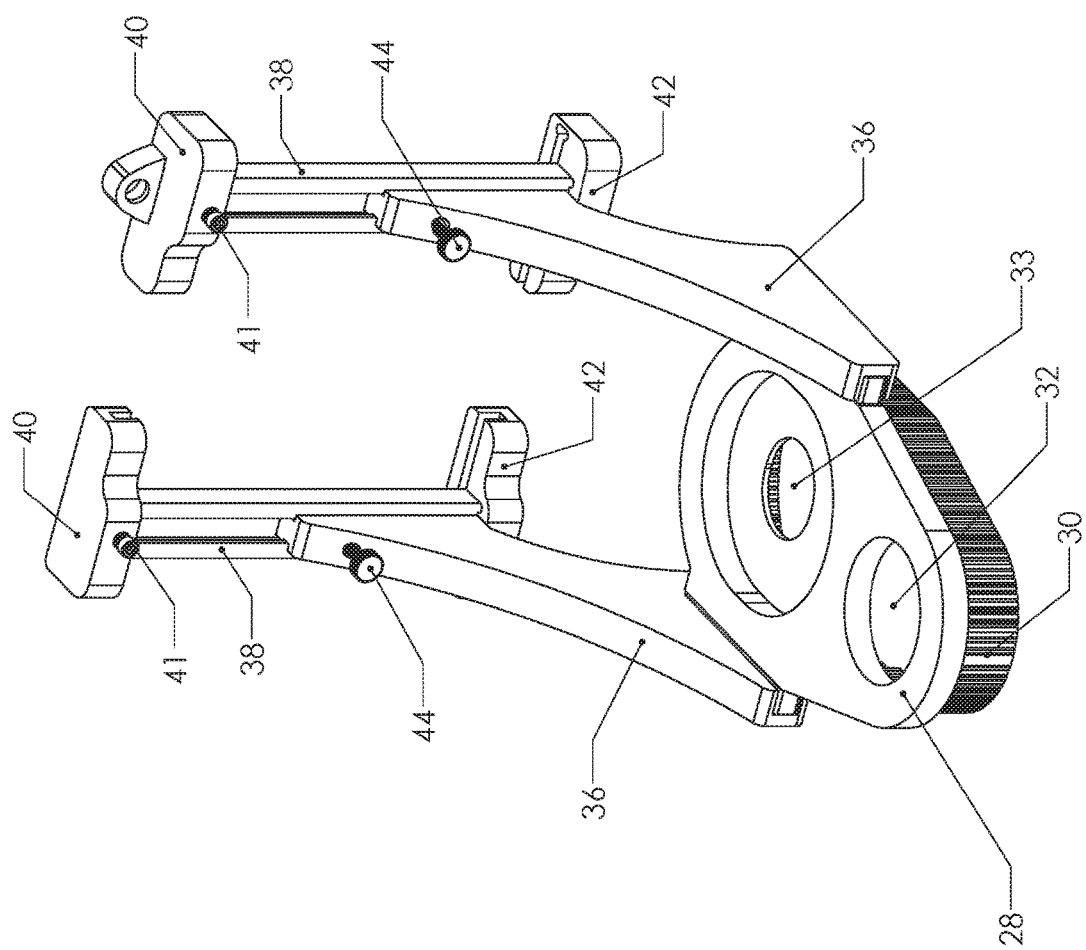
FIG. 3 is a perspective view of an embodiment of the debris control apparatus.

The invention will be described in detail with reference to the tabletop CNC mill/router shown in the drawings. It will be appreciated that the invention is not limited to such a router. The invention is applicable mutatis mutandis to other cutting machines which produce debris when the machine's cutting tool cuts the work material.

Referring now to FIG. 1, a tabletop CNC router machine 10 is shown. The router 10 is configured to position the routing bit precisely on the work material positioned below the bit. Thus, the router is configured to position the bit at the desired point with reference to the X-axis, Y-axis, and Z-axis (Z-axis refers to moving the bit into or out of the work material). In this specification, the word "depth" refers to the position along the Z-axis, and the term "front-back" refers to the Y-axis. The directions of these axes are shown in FIG. 2.

It will be appreciated that the labels given to the axes are a matter of convention. It will further be appreciated that the axes need not necessarily be the mutually orthogonal axes shown—other coordinate systems could be used to position the cutting tool. What is important in this embodiment of a CNC router is that the bit is positionable in three dimensions for precise locating of the bit.

The machine 10 includes support elements 12 which support the machine 10 on a support surface. In the preferred embodiment, positioned between support elements 12 is work material support surface 14. In a typical use of machine 10, the work material 13 (e.g. acrylic plastic) would be positioned on work material support surface 14 as it is being worked on by the cutting tool.

Positioned on opposite sides of the work material support surface 14, and being supported by support elements 12 are Y-axis support rails 16. The Y-axis support rails 16 each carry a Y-axis carriage 18. By moving along the rails 16, the carriages 18 move the X-axis support rail 20 and X-axis carriage 22, which in turn carry bit 26, to position the cutting tool at the desired position along the Y-axis.

In the preferred embodiment, extending between carriages 18 is X-axis support rail 20. Mounted on X-axis support rail 20 is X-axis carriage 22. X-axis carriage 22 moves along rail 20 to position the cutting tool 26 at the desired position on the X-axis. It will be appreciated that the machine 10 is programmed to move the cutting tool 26 to particular points in the X-Y plane so that the cutting tool can work on the work material 13 positioned on surface 14. The cutting tool 26 is moved to different points on the X-Y plane as the cutting tool 26 works on the work material 13.

It will be appreciated that, in the preferred embodiment, the carriage 22, and at least one of the carriages 18 are motorized so that the computer controller of machine 10 can use the motorized carriages to precisely position the cutting tool.

Mounted to carriage 22 is cutting tool spindle 24. The spindle 24 carries the cutting tool 26, which in the embodiment of FIG. 1 comprises bit 26. For the purposes of CNC machines, the spindle 24 is the element that holds the cutting tool 26 and moves in order to move the cutting tool into and out of the work material 13. Depending on the nature of the cutting tool, the spindle may rotate the cutting tool.

Spindle 24 is movably mounted to carriage 22. Typically, spindle 24 is also motorized, so that the computer controller of machine 10 can move the spindle up and down for precise positioning of bit 26.

A preferred form of the debris control apparatus as shown in FIGS. 1, 3, 4 and 5 will now be described. Debris shield 28 is, in operation, positioned above work material 13. Shield 28 has, extending downward therefrom, brush 30. Preferably, brush 30 is detachably attached to shield 28. Most preferably, brush 30 fits with shield 28 in a friction fit, though other modes of attachment are also comprehended (e.g. magnetic).

Preferably, shield 28 and brush 30 are sized, shaped and mutually positioned so that their depth can be adjusted to position the ends of the bristles of brush 30 to be lightly in contact with work material 13. As will be described in greater detail below, as shield 28 and brush 30 move along the surface of work material 13, brush 30 remains on material 13 (as opposed to moving up off of an then back down to material 13). Thus, shield 28 and brush 30 act as an enclosure for the debris generated, which is thus controlled by brush 30 under shield 28. Brush 30 preferably extends around the entire edge of shield 28 such that, when brush 30 is touching material 13, debris that is under shield 28 is contained thereunder by brush 30 as the enclosure moves along work material 13.

It will be appreciated that brush 30 should preferably be positioned at a depth where it is not pressing hard on material 13, as this would interfere with the movement of the enclosure, and possibly undesirably deform and wear the bristles of brush 30.

In the preferred embodiment, the shield 28 includes vacuum fitting opening 32, sized, shaped and positioned to receive vacuum conduit or fitting 34. A vacuum hose (not shown) can be inserted into fitting 34 so that debris created during operation of machine 10 can be vacuumed out or extracted from under shield 28 as machine 10 is operating. Also, as shown in FIGS. 1 and 2, the shield 28 includes a cutting tool access opening 33 through which the cutting tool extends to reach the work material 13. It will be appreciated that the opening 33 should be big enough to allow the cutting tool to move unimpeded, while being as small as is reasonably possible to keep debris from travelling out from under the shield 28.

In the embodiment of FIG. 1, and as further shown in FIGS. 3, 4 and 5, shield 28 and brush 30 are supported above work material 13 by mounting assembly 37 as follows. Shield 28 is removably mounted to at least one and preferably two support arms 36. Support arms 36 are each mounted to a depth adjusting mounting rail 38. The depth adjusting mounting rails are each mounted to carriage 22 by top and bottom carriage mounts 40, 42, which attach the rail to carriage 22. Carriage mounts 40 are fastened to carriage 22 by the tightening of carriage mount screws 41.

It will be appreciated that it is preferable for shield 28 and brush 30 to be depth adjustable, so that the tips of brush 30 can be positioned at the surface of work material 13 for adequate debris control. In this embodiment, this depth adjustability is achieved by means of the arms 36 being mounted in a depth-adjustable manner to rails 38. As can be seen in FIGS. 1 and 3, arm mounting screws 44 are used to mount arms 36 to rails 38. The depth of arms 36, and thus of shield 28 and brush 30, can be adjusted by loosening screws 44, moving arms 36 up or down within rails 38 as desired, and tightening screws 44 to complete the repositioning of arms 36, shield 28 and brush 30. The rails 38 provide a depth adjustment range, i.e. a range of depths over which arms 36, shield 28 and brush 30 can be positioned. In this embodiment the depth is continuously adjustable within the range.

It will be appreciated that the invention comprehends different depth adjusters besides the combination of arms 36, rails 38 and screws 44 described above. What is preferable is that the depth adjuster provide adequate continuous positioning of these elements to control the debris under shield 28 as shield 28 and brush 30 move along the work material 13.

It will further be appreciated that the precise mode of mounting the shield 28 and brush 30 to the carriage 22 will depend to some extent on the specific shape of carriage 22. In the embodiment of FIG. 1, the carriage 22 includes top and bottom flanges 46. As shown in FIG. 2, carriage mounts 40, 42 include recesses 49 that engage with flanges 46 so that the carriage mounts are attached to the carriage 22. However, the invention comprehends other configurations for mounting the shield 28 and brush 30 to the machine 10, inter alia, in situations where the machine 10 itself has a configuration different from that shown in FIG. 1.

In the embodiment of FIG. 1, the depth adjustability of the mounting is achieved by the arms 36 being mountable at a variety of locations within the depth adjustment range along the rails 38. However, it will be appreciated that a different set of elements can be used to achieve depth adjustable mounting. For example, the support arms could be mounted at a fixed height, while those arms and shield 28 are configured so that the mounting of the shield to the support arms is depth adjustable. Other configurations are also comprehended. What is important is that the shield be depth adjustable so that it can be positioned with brush 30 at work material 13 to control debris under shield 28.

The inventor has discovered that a drawback of some prior art devices is caused by the dust boot being mounted to the spindle. As a result, the dust boot moves up and down as the cutting tool moves up and down. This causes the dust boot to move away from the work material when the spindle moves up, and when the spindle moves laterally while the cutting tool is spaced away from the work material, the debris escapes from under the shield. In the preferred embodiment of the present invention, this problem is ameliorated, because when the machine 10 operates the shield 28 and brush 30 function as an enclosure that is in contact with the work material, thus maintaining the debris under shield 28.

Furthermore, it has been found that mounting a dust boot to the spindle has a negative effect on the precision of the machine 10, particular in relation to Z-axis (depth) positioning of the cutting tool. Specifically, the weight of the dust boot affects the ability of the motorized spindle to precisely position the cutting tool, most commonly (but not solely) in cases where the dust boot is retrofitted to the machine 10. However, in the preferred embodiment of the present invention, the shield 28, brush 30 and mounting assembly do not depend from the spindle 24. The spindle 24 moves the cutting tool 26 up and down without the shield 28 moving, because the shield is mounted to machine 10 independent of the spindle 24, and independent of the movement of the cutting tool in and out of the work material; thus the spindle 24 moves up and down independent of the shield 28 (i.e. without moving shield 28) and its various mounting elements.

Figure 4:
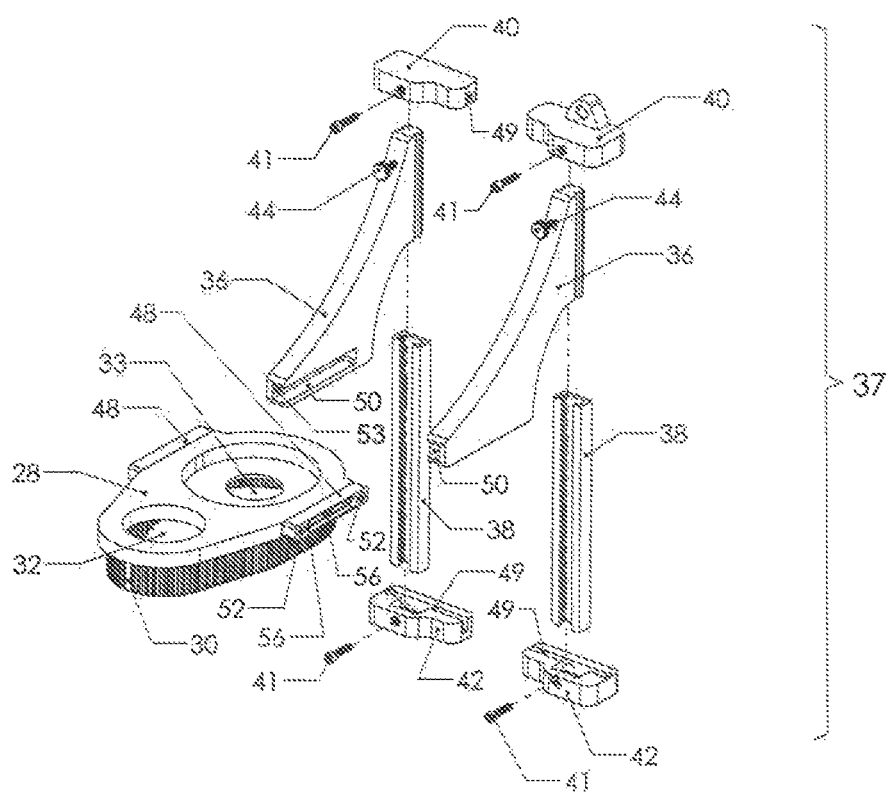
FIG. 4 is an exploded perspective view of an embodiment of the debris control apparatus.

As shown in FIGS. 3 and 4, the shield 28 is preferably removably mounted to support arms 36, and preferably configured for attachment to and removal from the mounting assembly in a front-back direction (though attachment and detachment in a sideways direction may also be adequate). Shield 28 includes a flange 48 corresponding to each arm 36, which flanges are sized, shaped and positioned to fit into recesses 50 of arms 36. Thus, when the debris control apparatus is being assembled or disassembled, the shield 28 can be fitted into arms 36 by inserting flanges 48 into recesses 50, or removing flanges 48 from recesses 50. It will be appreciated that this feature can be helpful when the cutting tool or work material are being changed. Specifically, because shield 28 can be easily removed from arms 36, it is not necessary to take apart the mounting assembly, or even change the depth of the mounting assembly, to change the bit or the work material. Rather, in this embodiment, the shield 28 is detached, the bit or work material is changed, and the shield is reattached, without any other action taken on the mounting assembly.

In the preferred embodiment, the each flange 48 includes at least one and preferably two flange magnets 52, and the recesses 50 each include corresponding recess magnets 53. Magnets 52 and magnets 53 are mutually attracting, and they are sized, shaped and positioned to hold shield 28 to arms 36 by holding flanges 48 within recesses 50. When it is desired to remove shield 28 from recesses 50, a user pulling on shield 28 can pull to overcome the force of the magnets, and remove the shield 28. The shield 28 is thus detachably attachable to arms 36. It will be appreciated that the embodiment of the invention comprehends other forms of attaching the shield 28 arms 36. For example, locking pins or the like could be used, as could a friction fit.

Figure 5:
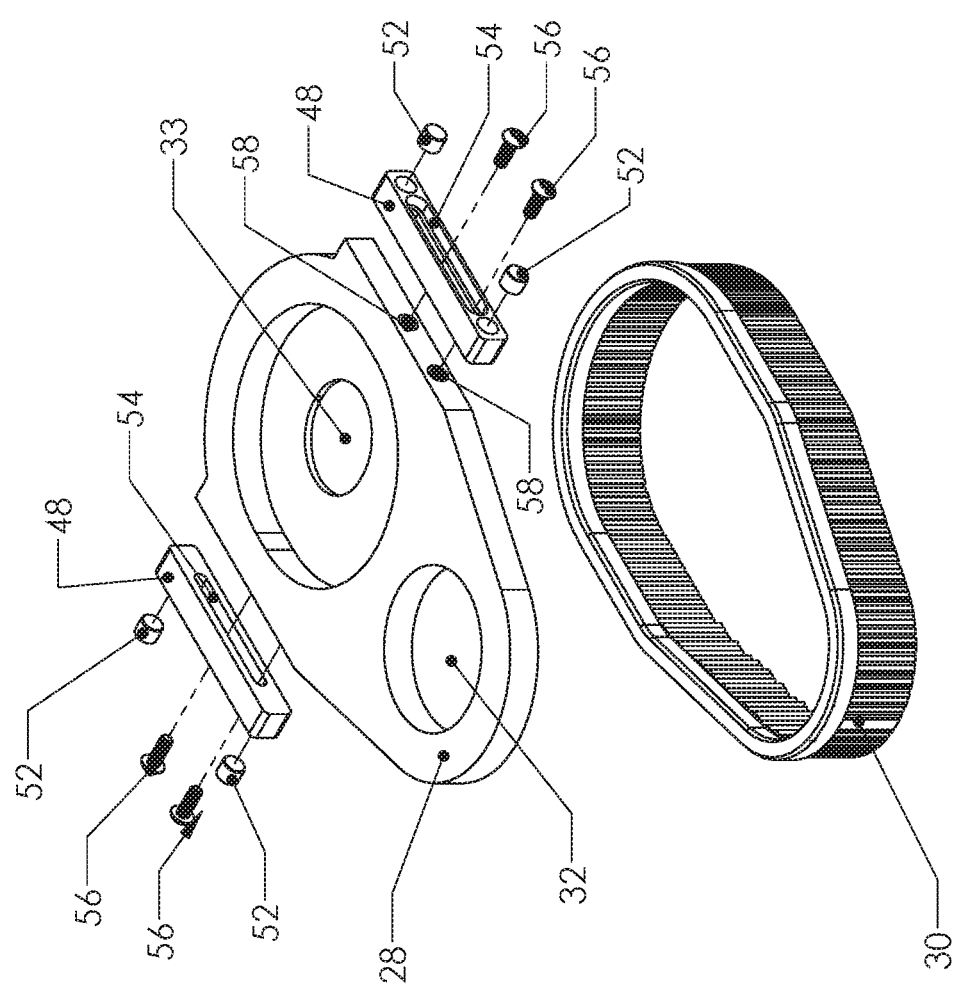
FIG. 5 is an exploded perspective view of a portion of an embodiment of the debris control apparatus.
Figure 7:
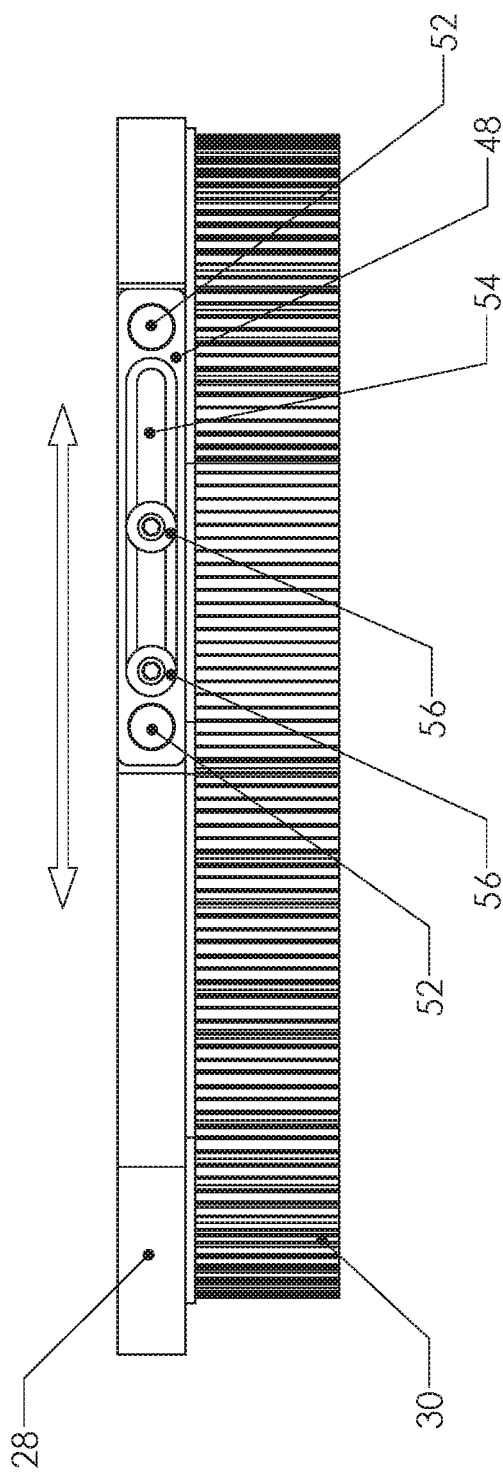
FIG. 7 is an elevation view of the shield and brush that form part of some embodiments of the debris control apparatus.
Figure 8:
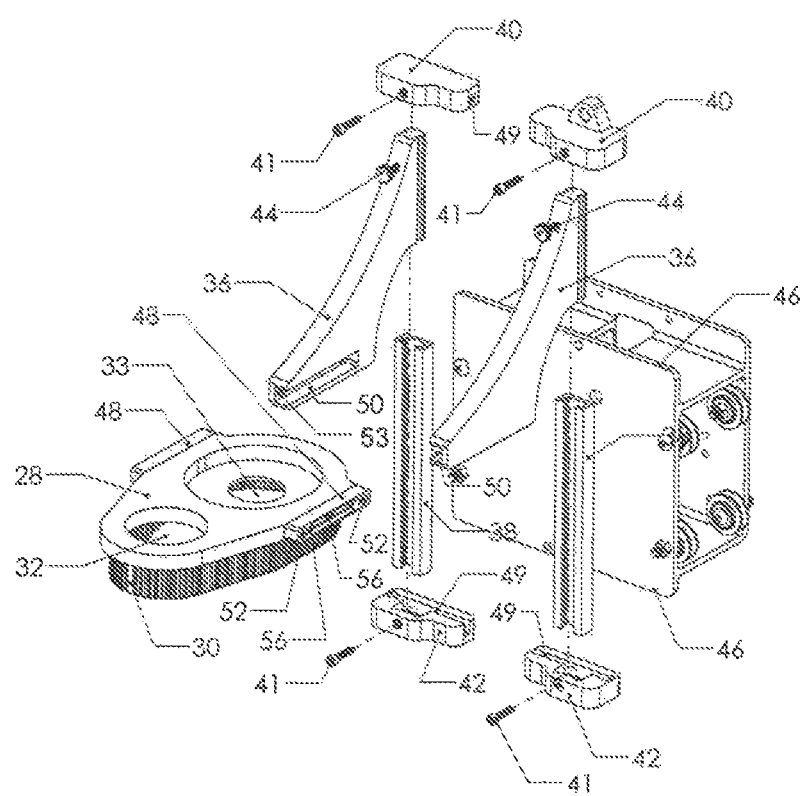
FIG. 8 is an exploded perspective view of an embodiment of the debris control apparatus.

In the preferred embodiment, as shown in FIGS. 5 and 7, flanges 48 are selectively positionable on shield 28. Flanges 48, which are detachably attachable to shield 28, each preferably includes flange openings 54. Flange screws 56 and flange openings 54 are sized and shaped for the attachment of flanges 48 to shield 28. In this embodiment, screws 56 are inserted through opening 54 and screwed into flange attachment holes 58 in shield 28. Because holes 58 (a pair for each flange) are closer together than the width of the opening 54—that is, opening 54 is wider than the distance between holes 58—there is a range of possible attachment positions for flanges 48.

The attachment position of flanges 48 to shield 28 in turn dictates the position of shield 28 relative to arms 36, carriage 22, spindle 24 and bit 26. The further back (i.e. toward the top of FIG. 1) the flanges are positioned, the further forward the shield 28 will be positioned when mounted, and vice versa. Thus, this configuration allows the operating position of shield 28 to be selectively adjusted in the front-back direction (i.e. along the Y axis) according to the specific configuration of machine 10, to allow, inter alia, the opening 33 to line up with bit 26, so that machine 10 can operate with the debris control apparatus mounted to it. It will be appreciated that other configurations that permit selective positioning of shield 28 relative to bit 26 are comprehended. What is important in the preferred embodiment is that the shield 28 be mounted so as to be selectively positionable in the front-back direction relative to the bit 26 so that the bit 26 will line up with opening 33.

Figure 6:
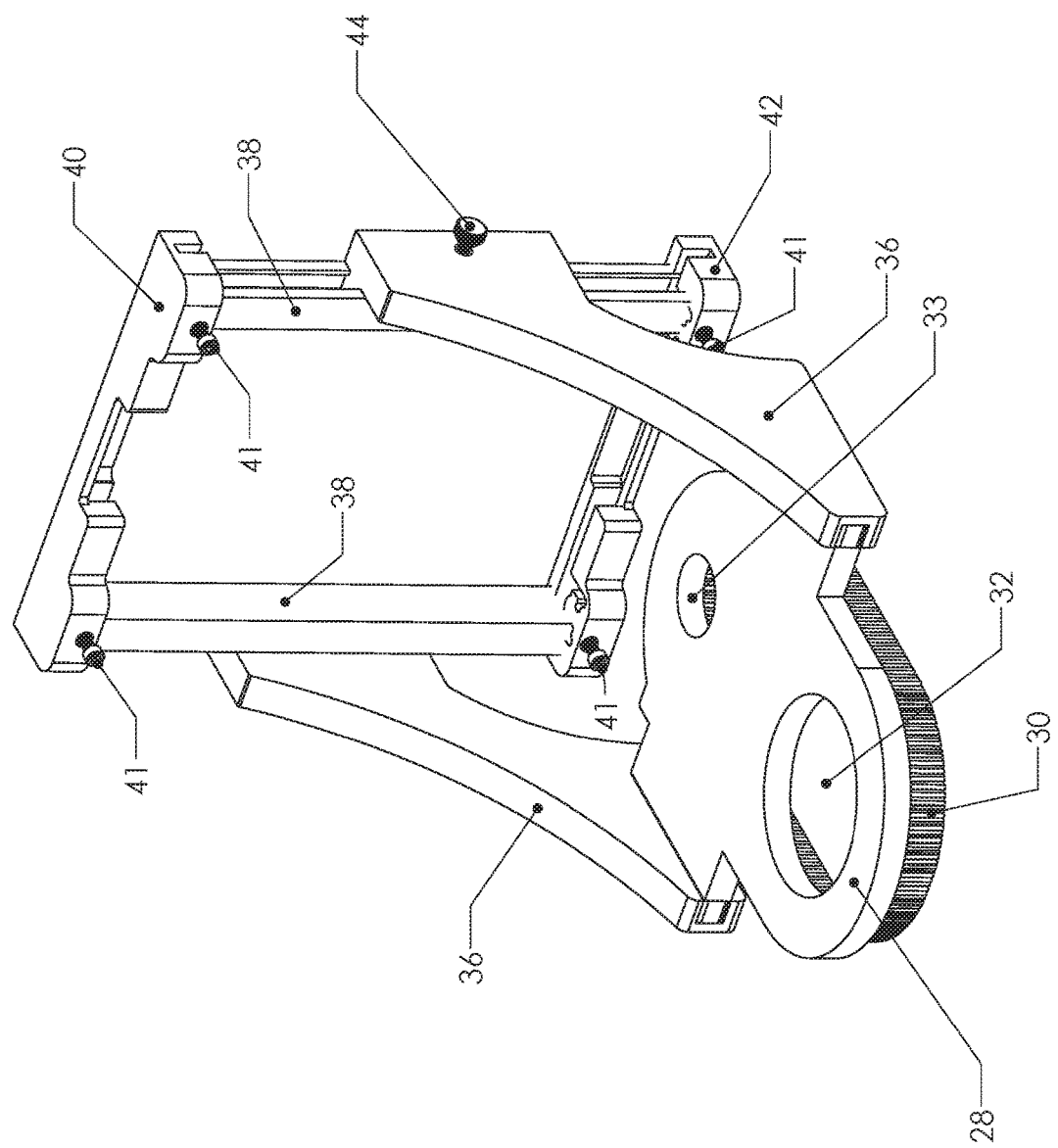
FIG. 6 is a perspective view of an alternate embodiment of the debris control apparatus.

FIG. 6 shows an alternative mounting assembly for shield 28, in which rails 38, instead of facing forward in the Y direction as shown in FIG. 1, face left and right respectively in the X direction (i.e. a side mount configuration). Arms 36 are modified accordingly in shape to fit into rails 38.

Figure 9:
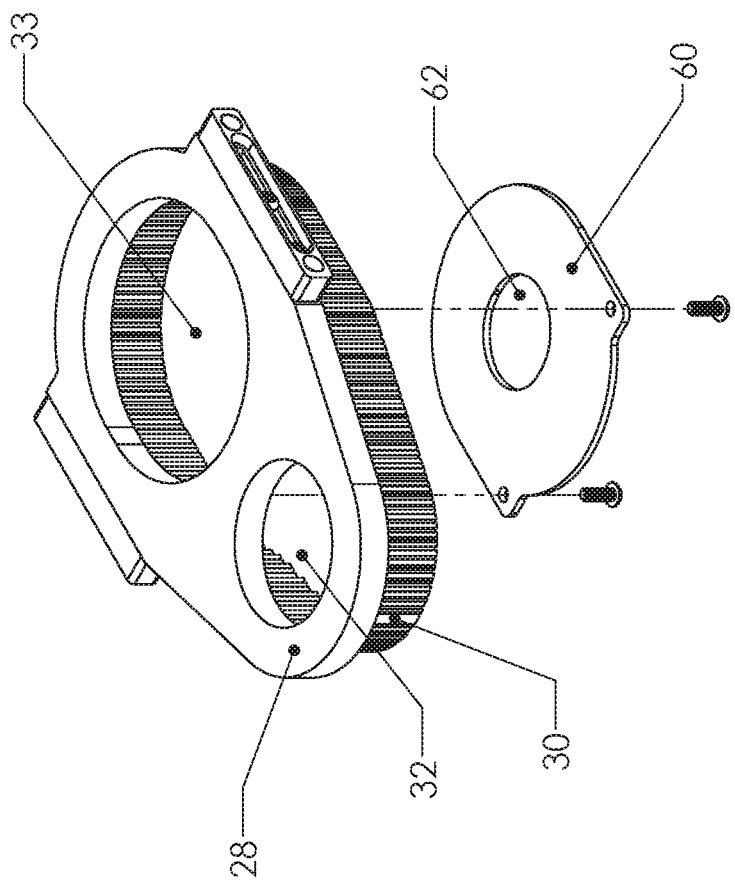
FIG. 9 is an exploded view of some of the components of the debris control apparatus.

In the embodiment shown in FIG. 9, the apparatus includes an air flow reducer 60, which is sized and shaped to fit over opening 33, and which includes its own central opening 62. Air flow reducer 60 reduces the size of opening 33 to reduce the flow of air through opening 33, thus reducing the escape of debris through opening 33 and allowing for better control of debris. With the reduction of air flow, more debris will remain under the shield 28, and less will come out through opening 33.

The configuration of FIG. 9 provides a certain flexibility to the apparatus. In an embodiment where the cutting tool needs to go very deep into the work material, the opening 33 may need to be relatively large so that the end of the spindle can enter the opening 33 somewhat. However, when the deeper movement of the spindle is not required, the air flow reducer 60 may be used, to reduce the size of the opening in shield 28.

It will be appreciated that the combination of shield 28 having a large opening 33, and flow reducer 60, provides greater flexibility. The large opening 33 can be employed when the cutting tool is relatively large and requires more space. When a smaller cutting tool, requiring less space, is in use, the flow reducer 60 can be used, and opening 62 is large enough for the small cutting tool to extend through.

Figure 10:
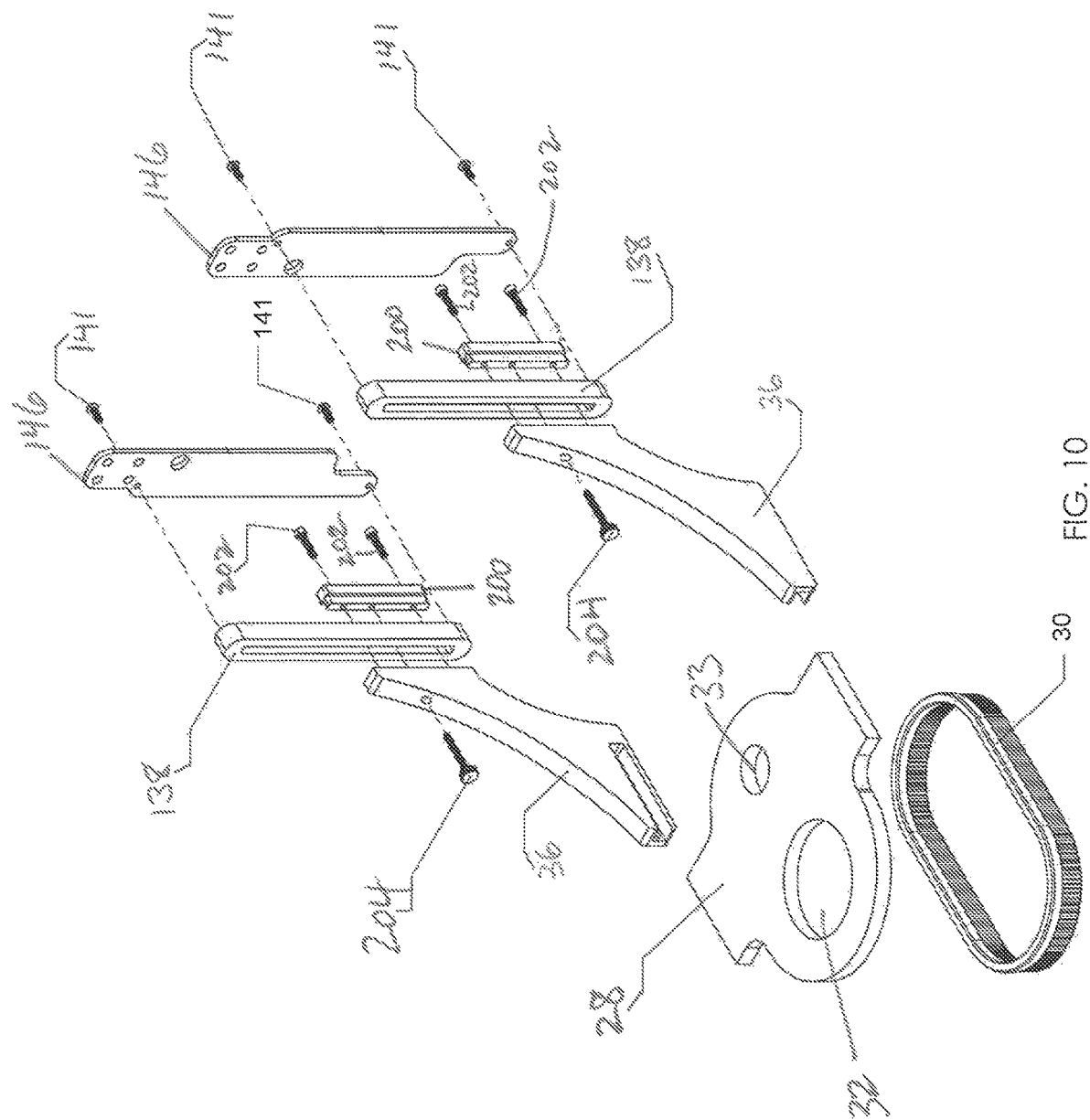
FIG. 10 is an exploded perspective view of a further alternate embodiment of the debris control apparatus.

Referring now to FIG. 10, an exploded view of an alternative form of the debris control apparatus is shown. The main difference between this alternative form, and the debris control apparatus shown in FIGS. 1, 3, 4 and 5, is the mode by which the arms 36 are mounted and positioned. In the embodiment of FIG. 10, rails 138 are attached to flanges 146 by means of rail screws 141. Support arms 36 are mounted to rails 138 by means of support arm guides 200 attached by guide screws 202 to support arms 36, via rails 138. Thus, the support arms 36, connected by guides 200, is slidable within rails 138. To position arm 36 at a particular depth, arm positioning screw 204 is inserted through arms 36 and tightened against guide 200 to hold the arm and the guide in place.

It will be appreciated that the mounting assemblies of, for example, FIG. 3, FIG. 6 and FIG. 10 all differ primarily because of the specifics of machine 10 that they are being mounted to. It will be appreciated that different machines 10 include different configurations to which the debris control apparatus is to be mounted. Thus, different mounting assemblies may be required to mount the shield 28 and brush 30 in a height adjustable manner so that brush 30 remains flush against the work material 13 as the cutting tool and moves into, out of and along work material 13.

There are other possible differences in the way the apparatus may be mounted. For example, FIG. 1 shows the X-axis carriage 22 carrying Z-axis rail 70, which in turn carries Z-axis carriage 72 (which moves up and down on rail 70), which in turn carries spindle 24. In some embodiments, it may be desirable, for example, to mount the mounting assembly to the Z-axis rail 70 (rather than, for example, X-axis carriage 22), which is still comprehended by the preferred embodiment because the Z-axis rail does not move up and down with the cutting tool, but is effectively stationary relative to the cutting tool.

It has been found that a brush height of about 0.75 inches to 1.5 inches is preferred. This amount of space under shield 28 appears maximize the effectiveness of the vacuum which still allowing the enclosure to clear work material hold downs and clamps that the enclosure passes over.

Figure 11:
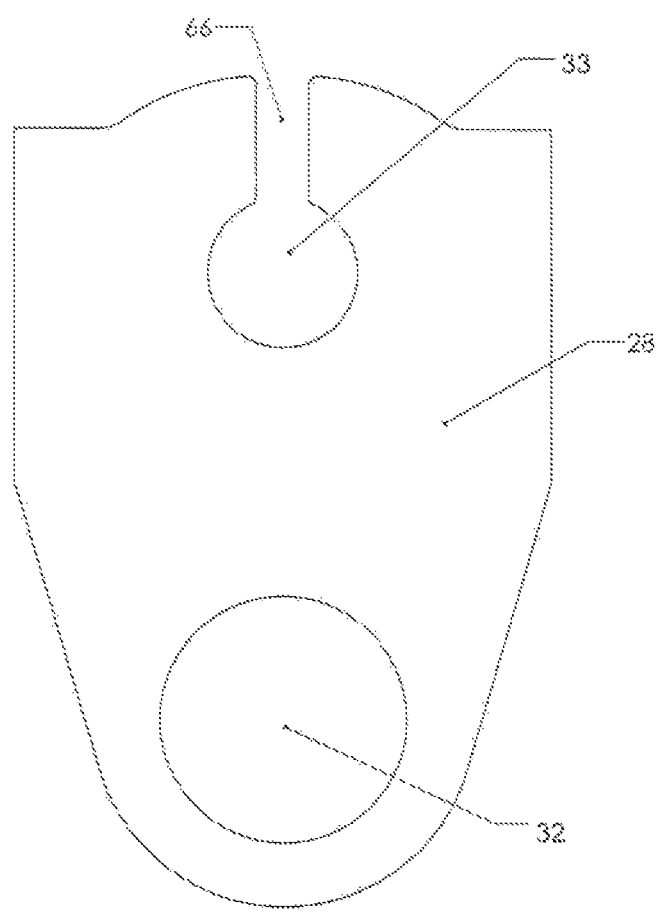
FIG. 11 is a plan view of an embodiment of a shield according to the present invention.
Figure 12:
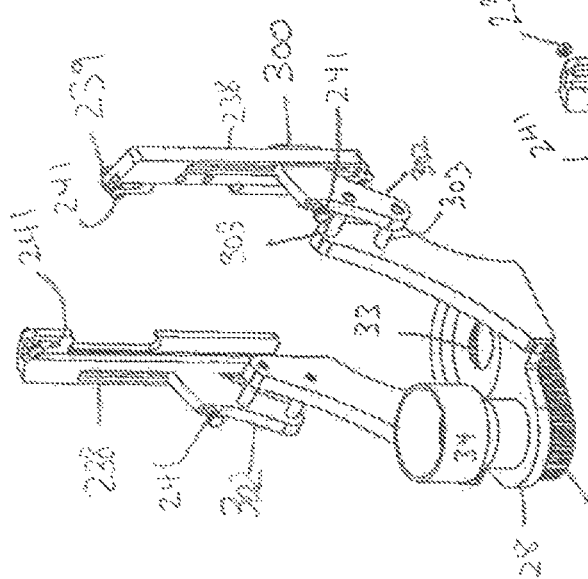
FIG. 12 is a perspective view of an alternate embodiment of the debris control apparatus.

Referring now to FIG. 11, an alternative form of shield 28 is shown. In the embodiment of FIG. 12, opening 33 includes tool removal conduit 66 which extends from opening 33 to the edge of shield 28. In this configuration, opening 33 is contiguous with an edge of shield 28 and allows shield 28 and a tool extending therethrough to be taken apart without the tool being lifted out through opening 33. Thus, if for some reason the machine 10 is malfunctioning, or for some other reason the tool is stuck in a down position, the shield 28 can be extracted by moving the shield 28 so that the tool moves through conduit 66. Typically, in configurations where the brush 30 is detachably attached to shield 28, the brush would be removed before the tool is moved out through conduit 66.

It will be appreciated that the present invention may be employed with a machine 10 that uses a laser cutting tool. Laser cutting tools can produce not only solid debris, but harmful gases, which can be contained and vacuumed away using the debris control apparatus. Furthermore, the shield 28 can be fashioned from a light attenuating material that can be used used to shield the eyes of persons viewing the laser cutting. Referring now to FIG. 17, laser shield 64 may be attached to shield 28. Laser shield 28 blocks most of the area of opening 33, and leave only laser cutter opening 66 to permit the laser cutting beam to travel to work material 13. The shield 64 provides a much smaller area through which the gases can escape, permitting them to be vacuumed up before they can escape into the ambient air and harm people nearby. Preferably, shield 64 can (like shield 28) be made from a translucent material that simultaneously shields the eyes from the harmful electromagnetic rays from laser cutting, obviating the need for the wearing of googles by the user.

It will be appreciated that preferably, the debris control apparatus is configured to attach to the machine 10 without substantial alteration or modification of machine 10. Thus, most preferably, the mounting assembly is configured so that it attaches to the machine 10 as is, without modification. Thus, if machine 10 already has holes on various plates, flanges etc. through which mounting screws can be attached, then ideally, the apparatus can make use of such existing holes for the mounting assembly. Less preferably, some minor modifications are comprehended by the preferred embodiment, such as, for example, drilling screw holes in machine 10 which can be used to receive mounting screws and the like.

Thus, for example, in the embodiment shown in FIGS. 1-4, carriage mounts 40, 42 include recesses that receive both flange 46 and rails 38. Thus, rails 38 can be held against flange 46 without drilling any holes in flange 46. In this embodiment, tightening screws 41 holds the carriage mounts and rails 38 all on flange 46. The mounting assembly is thus connected to machine 10 without modifications thereto.

Figure 13:
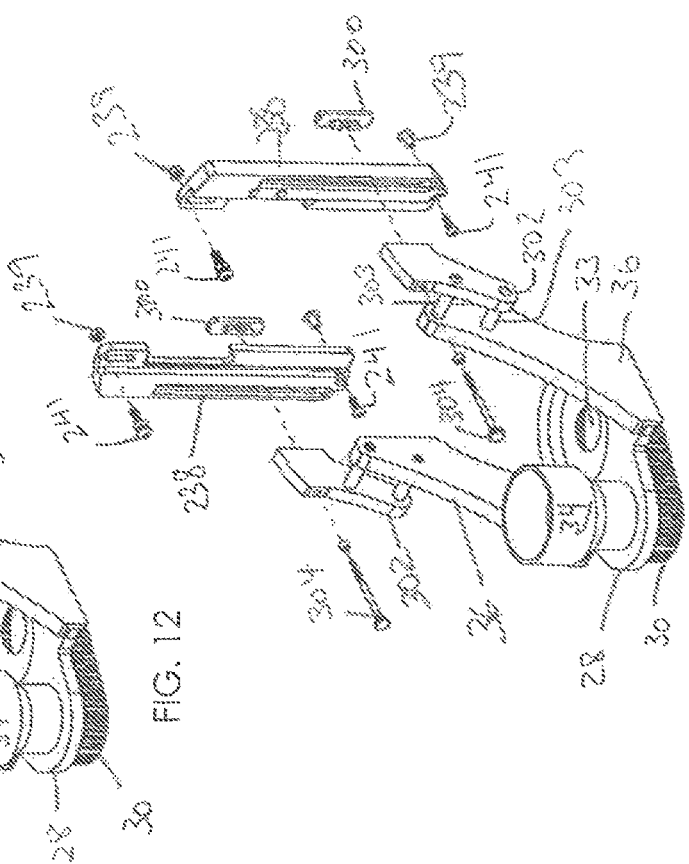
FIG. 13 is an exploded view of the alternate embodiment of FIG. 12.
Figure 14:
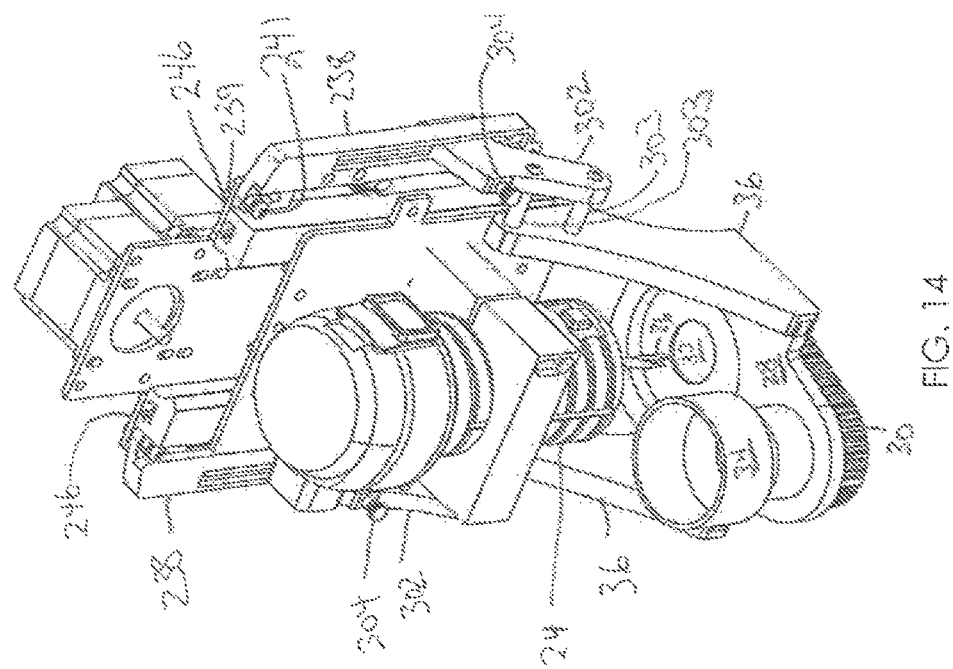
FIG. 14 shows a portion of a cutting machine with the embodiment of FIG. 12 mounted thereto.

Referring now to FIGS. 12-14, an alternative mounting assembly is shown. In this embodiment, flange 246 includes holes through which screws 241 can extend to fasten rails 238 to the machine 10. Nuts 239 cooperate with screws 241 to hold the rails 238 on the machine. Screws 241 extend through flange 246 and through a hole in the side of each rail element 238. Meanwhile, the depth adjustment is achieved using screws 304 connected screwing into guides 300 to adjust the mounting depth of arms 36. Screws 304 attach guides 300 to rails 238 at the desired depth. This aspect of the mounting (i.e. the use of guides) is generally similar to the embodiment of FIG. 10. In this embodiment, arms 36 each include widening portions 302 and widening connectors 303 which allow arms 36, narrowly spaced at the shield 28, to be widened for mounting to machine 10 when the mounting position is wider than in other configurations.

Figure 16:
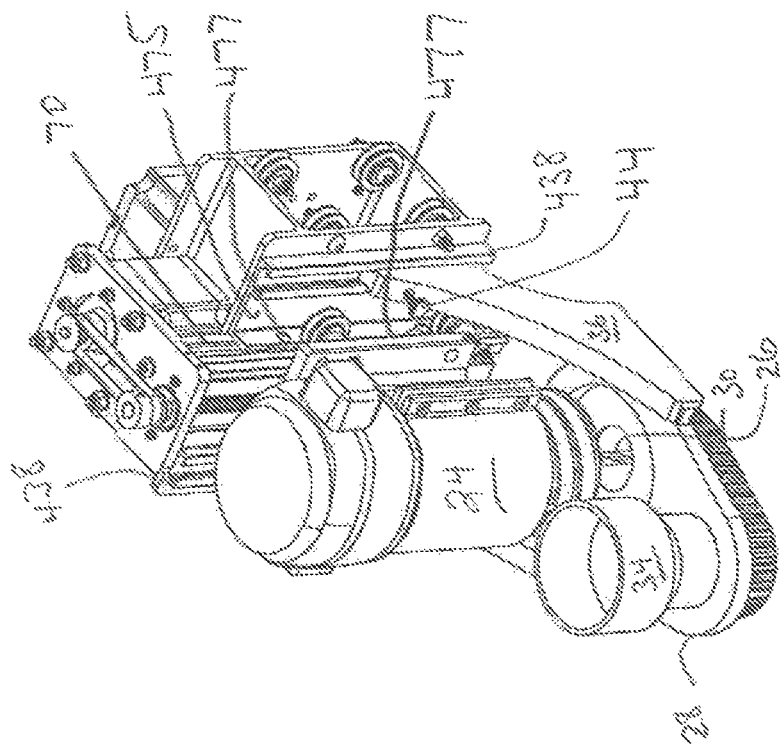
FIG. 16 shows a portion of a cutting machine with the embodiment of FIG. 15 mounted thereto.
Figure 15:
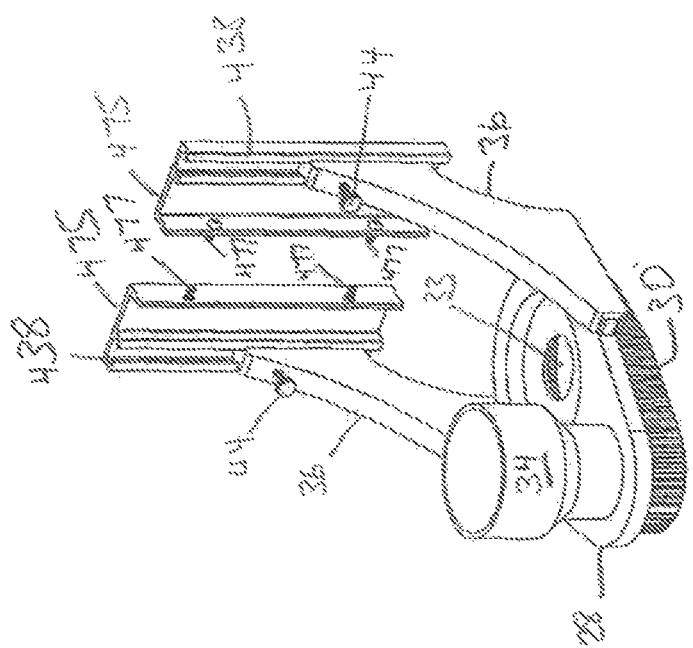
FIG. 15 is a perspective view of an alternate embodiment of the debris control apparatus.

Referring now to FIGS. 15 and 16, an alternate mounting assembly is shown. Rails 438 are attached to brackets 475. Screws 477 are used to attach the brackets 475 to Z-axis rails 70, or to a portion of the X-axis carriage adjacent to the Z-axis rails. T-slot nuts (also known as double spring tab fasteners, not shown) are preferably inserted into the z-axis rails, and screws 477 are screwed into the nuts to hold the brackets 475 in place. This is also a side mount configuration, with the mounting assembly attaching to a portion of machine 10 that faces left or right, rather than forward. It will be appreciated that other side mount, front mount and even rear mount configurations are comprehended.

It will be appreciated that, even in non-preferred configurations in which the shield or enclosure is mounted to machine 10 so as to move up and down as the cutting tool moves in and out of the cutting material, the detachable attachment configuration of the shield/enclosure may be employed. As disclosed, for example, in FIGS. 1-4, the enclosure is detachably attached to the mounting assembly. It preferably is attached by at least one magnetic connector which holds the enclosure in place, but whose holding force can be overcome but manual detachment of the enclosure from the mounting assembly. Locking pins or the like, or a friction fit, may for example be employed as alternates to the at least one magnetic connector. Preferably, at least one enclosure support element (e.g. one or more arms 36) is attached to the machine 10 and carried the enclosure. Preferably, the enclosure and support element are configured so that the enclosure is attached to the support element and detached therefrom in a front-back direction. Alternatively, the shield 28 can come off in a sideways or other direction. The detachable attachment of the shield 28 is, as mentioned above, beneficial because it allows for easy change of the cutting tool and/or work material without having to take apart the mounting assembly, or to even raise the mounting assembly, or to change the depth of the mounting assembly. Rather, the brush and shield can be removed, the cutting tool or work material changed, and the shield and brush reattached without any action on the mounting assembly.

While the foregoing preferred embodiments of the present invention have been set forth in considerable detail for the purpose of making a complete disclosure of the invention, it will be apparent to those skilled in the art that other embodiments described herein are comprehended by the broad scope of the invention as defined in the appended claims. For example, the brush 30 as shown in the attached drawings has bristles. However, the invention comprehends other forms of brushes (e.g. sponge material). The function of the brush 30 in the preferred embodiment is to hold the debris under shield 28 as the shield 28 moves along the work material, until that debris is vacuumed up.

The invention claimed is:

1. A debris control apparatus for a cutting machine, wherein the cutting machine includes: (i) a cutting tool for cutting a work material; and (ii) a carriage movably mounted on a support structure for supporting the cutting tool, the debris control apparatus comprising:
   a debris control enclosure shaped to admit the cutting tool to the work material while containing, within the enclosure and on the work material, debris from the cutting of the work material, as the cutting tool moves during operation of the cutting machine and relative to the support structure along a surface of the work material, through which surface the cutting tool moves into the work material, the enclosure having an outer surface defining an upper face and a lower face and comprising:
      a vacuum opening in said enclosure, the vacuum opening having an axis extending through the upper and lower faces, nonparallel with the surface of the work material during operation of the cutting machine, and being sized, shaped and positioned to receive a vacuum conduit, connected to a vacuum source, for extracting the debris from the enclosure, and
      a first flange and a second flange, each of the first flange and the second flange projecting from a central portion of the enclosure; and
   the debris control apparatus further comprising a mounting assembly for mounting the enclosure to the carriage such that, during operation of the cutting machine, the enclosure moves along the surface as the cutting tool moves along the surface and relative to the support structure, the enclosure being mounted such that movement of the cutting tool in and out of the work material does not cause movement of the enclosure, the mounting assembly comprising:
      a first support arm and a second support arm, each of the first support arm and the second support arm for supporting the enclosure, the first support arm and the second support arm each having a respective first engagement portion at a respective first end and a respective second engagement portion at a respective second end, wherein the first engagement portion of the first support arm slidably engages the first flange and the first engagement portion of the second support arm slidably engages the second flange, securing the enclosure to the first support arm and to the second support arm, such that the first and second support arms extend from the enclosure, and
      a depth adjuster for enabling an operating depth of the enclosure to be adjusted, wherein the depth adjuster comprises a first rail and a second rail, each of the first rail and the second rail being attachable to the carriage, the first rail and the second rail each comprising:
         a respective elongated engagement portion having a respective length;
         a respective axis that is substantially perpendicular with the surface of the work material during operation of the cutting machine; and
         a respective depth adjustment range along the length of the respective elongated engagement portion of the corresponding rail;

wherein, during operation of the cutting machine, the second engagement portion of the first support arm engages the elongated engagement portion of the first rail and the second engagement portion of the second support arm engages the elongated engagement portion of the second rail, such that the first and the second support arms are secured to and extend from the first and the second rails, respectively, and the first and the second support arms are selectively adjustable relative to the first and the second rail, respectively, along the respective length of the respective elongated engagement portion within the respective depth adjustment range, and whereby, prior to operation of the cutting machine, the depth of the enclosure can be adjusted such that the debris will be contained in the enclosure during operation of the cutting machine.

2. The debris control apparatus as claimed in claim 1, the cutting machine comprising a spindle which holds the cutting tool and moves the cutting tool into and out of the work material, the spindle being mounted to the carriage and the mounting assembly being a mounting assembly for mounting the enclosure to the carriage, such that the spindle and the enclosure are independently and separately mounted to the carriage, without the enclosure depending from the spindle.

3. The debris control apparatus as claimed in claim 1, wherein the depth adjuster enables continuous adjustment of the operating depth within the depth adjustment range of each of the first and the second rail.

4. The debris control apparatus as claimed in claim 1, wherein the enclosure comprises a debris shield for maintaining the debris at the work material, and a brush, depending from the debris shield, for controlling the debris as the cutting tool moves along the work material.

5. The debris control apparatus as claimed in claim 4, wherein the debris shield and brush are sized, shaped and mutually positioned such that the depth of the enclosure can be adjusted to position the brush lightly in contact with the work material such that, when the enclosure moves along the work material, the brush maintains the debris under the debris shield.

6. The debris control apparatus as claimed in claim 1, wherein the mounting assembly and enclosure are configured for selective adjustment, in a front-back direction, of an operating position of the enclosure.

7. The debris control apparatus as claimed in claim 1, wherein the carriage is an X-axis carriage, and wherein the mounting assembly is configured to mount the enclosure to the X-axis carriage.

8. A debris control apparatus for a cutting machine, wherein the cutting machine includes: (i) a cutting tool for cutting a work material; and (ii) a carriage movably mounted on a support structure for supporting the cutting tool, the debris control apparatus comprising:

a debris control enclosure shaped to admit the cutting tool to the work material while containing, within the enclosure and on the work material, debris from the cutting of the work material, as the cutting tool moves during operation of the cutting machine and relative to the support structure along a surface of the work material, through which surface the cutting tool moves into the work material, the enclosure having an outer surface defining an upper face and a lower face and comprising:

a vacuum opening in said enclosure, the vacuum opening having an axis extending through the upper and lower faces, nonparallel with the surface of the work material during operation of the cutting machine, and being sized, shaped and positioned to receive a vacuum conduit, connected to a vacuum source, for extracting the debris from the enclosure, and at least one flange projecting from a central portion of the enclosure; and the debris control apparatus further comprising a mounting assembly for mounting the enclosure to the carriage such that, during operation of the cutting machine, the enclosure moves along the surface as the cutting tool moves along the surface and relative to the support structure, the enclosure being mounted such that movement of the cutting tool in and out of the work material does not cause movement of the enclosure, the mounting assembly comprising:

at least one support arm for supporting the enclosure, the at least one support arm having a first engagement portion at a first end and a second engagement portion at a second end, wherein the first engagement portion slidably engages the at least one flange, securing the enclosure to the at least one support arm, such that the at least one support arm extends from the enclosure, and a depth adjuster for enabling an operating depth of the enclosure to be adjusted, wherein the depth adjuster comprises at least one rail attachable to the carriage, the at least one rail comprising:

an elongated engagement portion having a length;

an axis that is substantially perpendicular with the surface of the work material during operation of the cutting machine; and a depth adjustment range along the length of the at least one rail, wherein the enclosure comprises at least one magnet, and wherein the mounting assembly comprises at least one magnetic connector for detachably attaching the enclosure to the at least one support arm by connection to the at least one magnet and wherein, during operation of the cutting machine, the second engagement portion of the at least one support arm engages the elongated engagement portion of the at least one rail, such that the at least one support arm is secured to and extends from the at least one rail and is selectively adjustable relative to the at least one rail along the length of the elongated engagement portion within the depth adjustment range, whereby, prior to operation of the cutting machine, the depth of the enclosure can be adjusted such that the debris will be contained in the enclosure during operation of the cutting machine.

9. A debris control apparatus for a cutting machine, wherein the cutting machine includes: (i) a cutting tool for cutting a work material; and (ii) a carriage movably mounted on a support structure for supporting the cutting tool, the debris control apparatus comprising:

a debris control enclosure shaped to admit the cutting tool to the work material while containing, within the enclosure and on the work material, debris from the cutting of the work material, as the cutting tool moves during operation of the cutting machine and relative to the support structure along a surface of the work material, through which surface the cutting tool moves into the work material, the enclosure having an outer surface defining an upper face and a lower face and comprising:

a vacuum opening in said enclosure, the vacuum opening having an axis extending through the upper and lower faces, nonparallel with the surface of the work material during operation of the cutting machine, and being sized, shaped and positioned to receive a vacuum conduit, connected to a vacuum source, for extracting the debris from the enclosure;

at least one flange projecting from a central portion of the enclosure; and a debris shield for maintaining the debris at the work material, and a brush, depending from the debris shield, for controlling the debris as the cutting tool moves along the work material, wherein the debris shield comprises an opening to admit the cutting tool to the work material, and wherein the enclosure further includes a laser shield attached to the debris shield and sized to admit a laser cutting beam to the work material while reducing the size of said debris shield opening to reduce air flow out of the enclosure, and the debris control apparatus further comprising a mounting assembly for mounting the enclosure to the carriage such that, during operation of the cutting machine, the enclosure moves along the surface as the cutting tool moves along the surface and relative to the support structure, the enclosure being mounted such that movement of the cutting tool in and out of the work material does not cause movement of the enclosure, the mounting assembly comprising:

at least one support arm for supporting the enclosure, the at least one support arm having a first engagement portion at a first end and a second engagement portion at a second end, wherein the first engagement portion slidably engages the at least one flange, securing the enclosure to the at least one support arm, such that the at least one support arm extends from the enclosure, and a depth adjuster for enabling an operating depth of the enclosure to be adjusted, wherein the depth adjuster comprises at least one rail attachable to the carriage, the at least one rail comprising:

an elongated engagement portion having a length;

an axis that is substantially perpendicular with the surface of the work material during operation of the cutting machine; and a depth adjustment range along the length of the at least one rail, wherein, during operation of the cutting machine, the second engagement portion of the at least one support arm engages the elongated engagement portion of the at least one rail, such that the at least one support arm is secured to and extends from the at least one rail and is selectively adjustable relative to the at least one rail along the length of the elongated engagement portion within the depth adjustment range, whereby, prior to operation of the cutting machine, the depth of the enclosure can be adjusted such that the debris will be contained in the enclosure during operation of the cutting machine.

10. The debris control apparatus as claimed in claim 9, wherein the laser shield is composed of a translucent material treated to shield eyes from laser cutting electromagnetic rays.

11. A debris control apparatus for a cutting machine, wherein the cutting machine includes: (i) a cutting tool for cutting a work materials and (ii) a carriage movably mounted on a support structure for supporting the cutting tool, the debris control apparatus comprising:

a debris control enclosure shaped to admit the cutting tool to the work material while containing, within the enclosure and on the work material, debris from the cutting of the work material, as the cutting tool moves during operation of the cutting machine and relative to the support structure along a surface of the work material, through which surface the cutting tool moves into the work material, the enclosure having an outer surface defining an upper face and a lower face and comprising:

a vacuum opening in said enclosure, the vacuum opening having an axis extending through the upper and lower faces, nonparallel with the surface of the work material during operation of the cutting machine, and being sized, shaped and positioned to receive a vacuum conduit, connected to a vacuum source, for extracting the debris from the enclosure, and at least one flange projecting from a central portion of the enclosure; and the debris control apparatus further comprising a mounting assembly for mounting the enclosure to the carriage such that, during operation of the cutting machine, the enclosure moves along the surface as the cutting tool moves along the surface and relative to the support structure, the enclosure and mounting assembly being configured such that the enclosure is detachably attached to the mounting assembly, the mounting assembly comprising:

at least one support arm for supporting the enclosure, the at least one support arm having a first engagement portion at a first end and a second engagement portion at a second end, wherein the at least one flange is detachably engaged with the first engagement portion, removably securing the enclosure to the at least one support arm, such that the at least one support arm extends from the enclosure, the at least one support arm further having a slot for receiving the enclosure, wherein the enclosure can be inserted into and withdrawn from the slot; and a depth adjuster for enabling an operating depth of the enclosure to be adjusted, wherein the depth adjuster comprises at least one rail attachable to the carriage, the at least one rail comprising:

an elongated engagement portion having a length;

an axis that is substantially perpendicular with the surface of the work material during operation of the cutting machine; and a depth adjustment range along the length of the at least one rail, wherein, during operation of the cutting machine, the second engagement portion of the at least one support arm engages the elongated engagement portion of the at least one rail, such that the at least one support arm is secured to and extends from the at least one rail and is selectively adjustable relative to the at least one rail within the depth adjustment range, whereby, after detaching the enclosure from the mounting assembly, the cutting tool and the work material can be changed without action on the mounting assembly other than said detaching.

12. The apparatus as claimed in claim 11, wherein the enclosure is detached and attached from the at least one support arm in a front-back direction.

13. The apparatus as claimed in claim 11, wherein the enclosure is configured to be detached from the mounting assembly by pulling the enclosure.

14. A debris control apparatus for a cutting machine, wherein the cutting machine includes: (i) a cutting tool for cutting a work material; and (ii) a carriage movably mounted on a support structure for supporting the cutting tool, the debris control apparatus comprising:
- a debris control enclosure shaped to admit the cutting tool to the work material while containing, within the enclosure and on the work material, debris from the cutting of the work material, as the cutting tool moves during operation of the cutting machine and relative to the support structure along a surface of the work material, through which surface the cutting tool moves into the work material, the enclosure having an outer surface defining an upper face and a lower face and comprising:
  - a vacuum opening in said enclosure, the vacuum opening having an axis extending through the upper and lower faces, nonparallel with the surface of the work material during operation of the cutting machine, and being sized, shaped and positioned to receive a vacuum conduit, connected to a vacuum source, for extracting the debris from the enclosure, and
  - at least one flange projecting from a central portion of the enclosure; and
- the debris control apparatus further comprising a mounting assembly for mounting the enclosure to the carriage such that, during operation of the cutting machine, the enclosure moves along the surface as the cutting tool moves along the surface and relative to the support structure, the enclosure and mounting assembly being configured such that the enclosure is detachably attached to the mounting assembly, wherein the mounting assembly and enclosure are attached by at least one magnetic connector, the mounting assembly comprising:
  - at least one support arm for supporting the enclosure, the at least one support arm having a first engagement portion at a first end and a second engagement portion at a second end, wherein the at least one flange is detachably engaged with the first engagement portion, removably securing the enclosure to the at least one support arm, such that the at least one support arm extends from the enclosure, the at least one support arm further having a slot for receiving the enclosure, wherein the enclosure can be inserted into and withdrawn from the slot; and
  - a depth adjuster for enabling an operating depth of the enclosure to be adjusted, wherein the depth adjuster comprises at least one rail attachable to the carriage, the at least one rail comprising:
    - an elongated engagement portion having a length;
    - an axis that is substantially perpendicular with the surface of the work material during operation of the cutting machine; and
    - a depth adjustment range along the length of the at least one rail,
  wherein, during operation of the cutting machine, the second engagement portion of the at least one support arm engages the elongated engagement portion of the at least one rail, such that the at least one support arm is secured to and extends from the at least one rail and is selectively adjustable relative to the at least one rail within the depth adjustment range,
  whereby, after detaching the enclosure from the mounting assembly, the cutting tool and the work material can be changed without action on the mounting assembly other than said detaching.

15. A debris control apparatus for a cutting machine, wherein the cutting machine includes: (i) a cutting tool for cutting a work materials and (ii) a carriage for supporting the cutting tool, the debris control apparatus comprising:
- a debris control enclosure having an outer surface defining an upper face and a lower face; and the debris control enclosure having a cutting tool access opening to admit the cutting tool to the work material while containing, within the enclosure and on the work material, debris from the cutting of the work material, as the cutting tool moves, during operation of the cutting machine, along a surface of the work material through which surface the cutting tool moves into the work material, the enclosure further comprising a vacuum opening in said enclosure, the vacuum opening being sized, shaped and positioned to receive a vacuum conduit, connected to a vacuum source, for extracting the debris from the enclosure; and
- a mounting assembly for mounting the enclosure to the carriage such that, during operation of the cutting machine, the enclosure moves along the surface as the cutting tool moves along the surface, the enclosure being mounted such that movement of the cutting tool in and out of the work material does not cause movement of the enclosure, the mounting assembly comprising:
  - at least one support arm for supporting the enclosure, the at least one support arm having a first engagement portion at a first end and a second engagement portion at a second end, wherein the first engagement portion slidably and detachably engages an outer engagement portion of the enclosure, such that the at least one support arm extends from the enclosure, and
  - a depth adjuster for enabling an operating depth of the enclosure to be adjusted, the depth adjuster comprising at least one rail portion attachable to the carriage, the at least one rail portion comprising an elongated engagement portion having a length and an axis that is substantially perpendicular with the surface of the work material during operation of the cutting machine,
  wherein, during operation of the cutting machine, the second engagement portion of the at least one support arm engages the elongated engagement portion of the at least one rail portion, such that the at least one support arm extends from the at least one rail portion and is adjustable along the length of the elongated engagement portion;
  whereby, prior to operation of the cutting machine, the depth of the enclosure can be adjusted such that the debris will be contained in the enclosure during operation of the cutting machine,
  the apparatus further comprising an air flow reducing element selectively mountable to the lower face of the enclosure so as to reduce a size of the cutting tool access opening.

\* \* \* \* \*

UNITED STATES PATENT AND TRADEMARK OFFICE
CERTIFICATE OF CORRECTION

| | | |
|---|---|---|
| PATENT NO. | : 11,267,092 B2 | |
| APPLICATION NO. | : 15/438275 | |
| DATED | : March 8, 2022 | |
| INVENTOR(S) | : Chepurny | |

It is certified that error appears in the above-identified patent and that said Letters Patent is hereby corrected as shown below:

On the Title Page

Column 2, Item (74), in "Attorney, Agent, or Firm", Line 1, delete "Christenson," and insert -- Christensen, --, therefor.

On Page 2, Column 1, Item (51), under "Int. Cl.", Lines 1-3,
     *B23C 1/06*    (2006.01)
delete "*B23C 1/00*    (2006.01)" and insert -- *B23C 1/06*    (2006.01) --, therefor.

In the Specification

In Column 4, Line 44, delete "an" and insert -- and --, therefor.

In Column 7, Line 8, delete "Y axis)" and insert -- Y-axis) --, therefor.

In Column 8, Line 40, delete "used to" and insert -- to --, therefor.

In Column 8, Line 59, delete "etc." and insert -- etc., --, therefor.

In Column 9, Line 45, delete "example" and insert -- example, --, therefor.

In the Claims

In Column 12, Claim 8, Line 40, delete "magnet and" and insert -- magnet, and --, therefor.

Signed and Sealed this
Seventh Day of June, 2022

*Katherine Kelly Vidal*

Katherine Kelly Vidal
*Director of the United States Patent and Trademark Office*